US008535849B2

(12) United States Patent
Watanabe et al.

(10) Patent No.: US 8,535,849 B2
(45) Date of Patent: *Sep. 17, 2013

(54) ELECTROCHEMICAL CELL AND FUEL CELL USING AN IONIC CONDUCTOR

(75) Inventors: Masayoshi Watanabe, Yokohama (JP); Hirofumi Nakamoto, Susono (JP); Tomokazu Yamane, Yokohama (JP); Toshihiro Takekawa, Yokosuka (JP)

(73) Assignees: Nissan Motor Co., Ltd., Yokohama (JP); National University Corporation Yokohama National University, Yokohama (JP)

( * ) Notice: Subject to any disclaimer, the term of this patent is extended or adjusted under 35 U.S.C. 154(b) by 1 day.

This patent is subject to a terminal disclaimer.

(21) Appl. No.: 13/283,403

(22) Filed: Oct. 27, 2011

(65) Prior Publication Data

US 2012/0040272 A1 Feb. 16, 2012

Related U.S. Application Data

(62) Division of application No. 11/976,609, filed on Oct. 25, 2007, now Pat. No. 8,071,253.

(30) Foreign Application Priority Data

Oct. 27, 2006 (JP) ................................. 2006-291956
Jun. 27, 2007 (JP) ................................. 2007-169028

(51) Int. Cl.
*H01M 8/10* (2006.01)
*H01M 10/056* (2010.01)

(52) U.S. Cl.
USPC ........................... 429/492; 252/62.2; 429/498

(58) Field of Classification Search
USPC ................. 252/62.2; 429/498, 492; 361/503, 361/504

See application file for complete search history.

(56) References Cited

U.S. PATENT DOCUMENTS 4,839,249 A 6/1989 Jones et al.
6,096,856 A 8/2000 Helmer-Metzmann et al.
(Continued)

FOREIGN PATENT DOCUMENTS

EP 1 515 346 A1 3/2005
JP 06-093114 A 4/1994
(Continued)

OTHER PUBLICATIONS

Hirofumi Nakamoto et al., *Properties of Protic Ionic Liquids Consisting of Alkyl Amines and Oxo-Acids*, Abstracts of the 73th Meeting of the Electrochemical Society of Japan, Apr. 1, 2006, p. 147, The Electrochemical Society of Japan.

(Continued)

*Primary Examiner* — Gregg Cantelmo
(74) *Attorney, Agent, or Firm* — Foley & Lardner LLP

(57) ABSTRACT

An electrochemical cell includes an electrolyte membrane containing an ionic conductor. The ionic conductor includes:
(a) a cation expressed by one of Formulae (1) and (2):

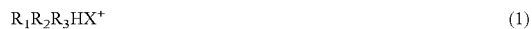

$$R_1R_2R_3HX^+ \quad (1)$$

where, in Formula (1), X indicates any one of N and P, and $R_1$, $R_2$ and $R_3$ each indicate any one of alkyl groups C1 to C18 except a structure in which $R_1=R_2=R_3$,

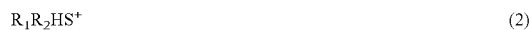

$$R_1R_2HS^+ \quad (2)$$

where, in Formula (2), $R_1$ and $R_2$ each indicate any one of alkyl groups C1 to C18 except a structure in which $R_1=R_2$; and
(b) an anion expressed by Formula (3):

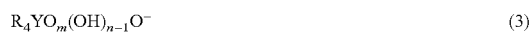

$$R_4YO_m(OH)_{n-1}O^- \quad (3)$$

where, in Formula (3), Y indicates any one of S, C, N and P, $R_4$ indicates any one of an alkyl group and a fluoroalkyl group, and m and n each indicate any one of 1 and 2.

4 Claims, 9 Drawing Sheets

(56) References Cited

U.S. PATENT DOCUMENTS

| | | |
|---|---|---|
| 2004/0038127 A1 | 2/2004 | Schlaikjer |
| 2005/0106440 A1 | 5/2005 | Komiya |
| 2005/0287441 A1 | 12/2005 | Passerini et al. |
| 2010/0233551 A1 | 9/2010 | Ogawa et al. |

FOREIGN PATENT DOCUMENTS

| | | |
|---|---|---|
| JP | 09-073908 A | 3/1997 |
| JP | 09-245818 A | 9/1997 |
| JP | 11-067224 A | 3/1999 |
| JP | 11-116679 A | 4/1999 |
| JP | 11 510198 A | 9/1999 |
| JP | 2003-123791 A | 4/2003 |
| JP | 2003-257476 | 9/2003 |
| JP | 2005-174911 | 6/2005 |
| JP | 2006-190618 | 7/2006 |
| JP | 2008-004533 | 1/2008 |
| WO | WO 01/15258 A1 | 3/2001 |
| WO | WO 2004/114445 A1 | 12/2004 |
| WO | WO 2005/064733 A1 | 7/2005 |

OTHER PUBLICATIONS

Hirofumi Nakamoto et al., *Bronsted Acid-base Ionic Liquids for Fuel Cell Electrolytes*, Chem. Communication, 2007, pp. 2539-2541.

Office Action dated Jan. 7, 2013 issued in connection with Japanese Patent Application No. 2007-169028, with English Translation.

FIG. 1

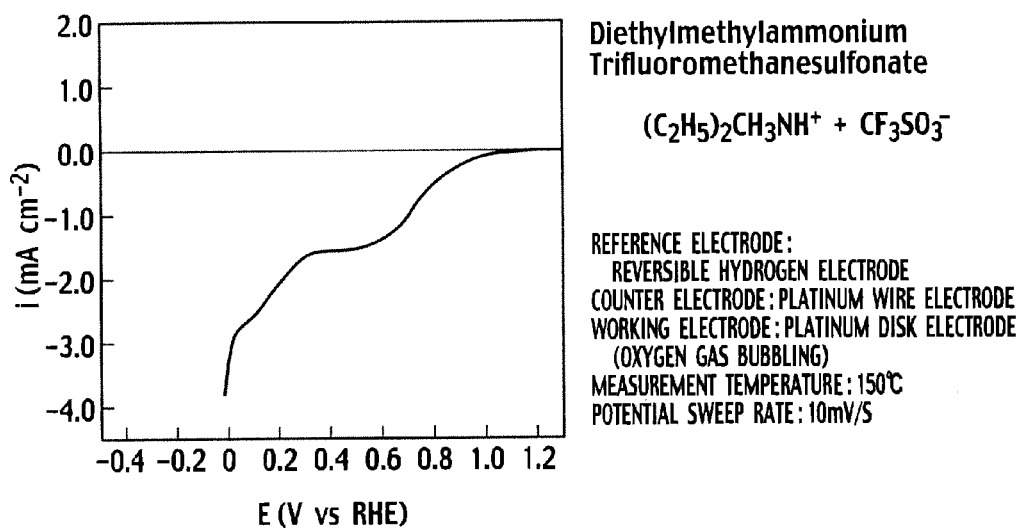

Diethylmethylammonium Trifluoromethanesulfonate $(C_2H_5)_2CH_3NH^+ + CF_3SO_3^-$ REFERENCE ELECTRODE:
  REVERSIBLE HYDROGEN ELECTRODE
COUNTER ELECTRODE: PLATINUM WIRE ELECTRODE
WORKING ELECTRODE: PLATINUM DISK ELECTRODE
  (OXYGEN GAS BUBBLING)
MEASUREMENT TEMPERATURE: 150°C
POTENTIAL SWEEP RATE: 10mV/S

FIG. 2

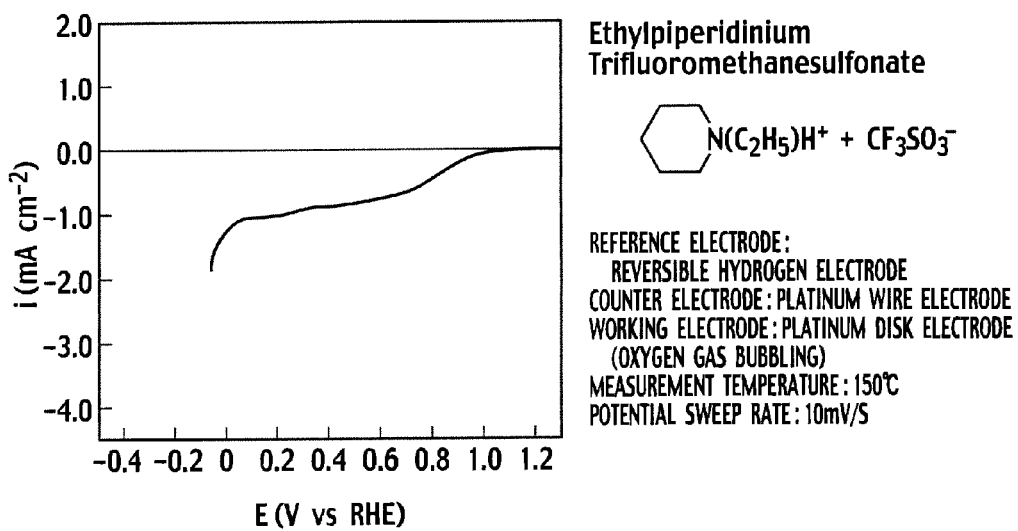

Ethylpiperidinium Trifluoromethanesulfonate $\langle\hexagon\rangle N(C_2H_5)H^+ + CF_3SO_3^-$ REFERENCE ELECTRODE:
  REVERSIBLE HYDROGEN ELECTRODE
COUNTER ELECTRODE: PLATINUM WIRE ELECTRODE
WORKING ELECTRODE: PLATINUM DISK ELECTRODE
  (OXYGEN GAS BUBBLING)
MEASUREMENT TEMPERATURE: 150°C
POTENTIAL SWEEP RATE: 10mV/S

FIG. 3

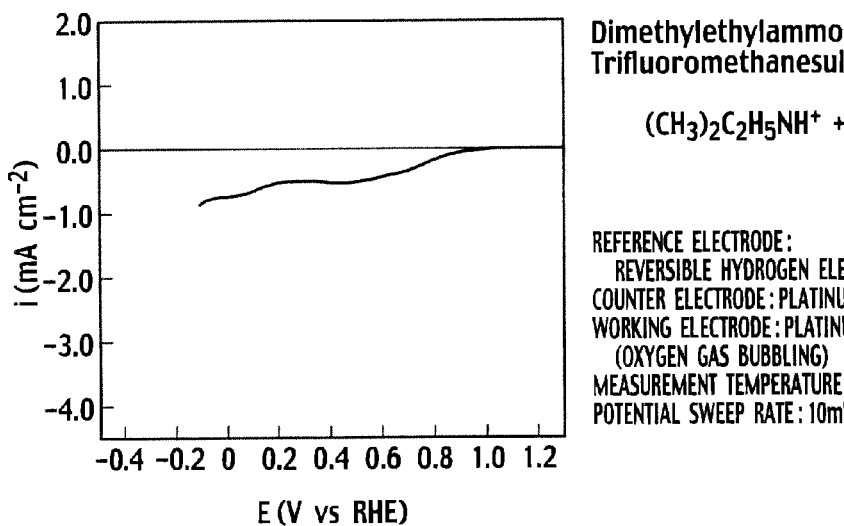

Dimethylethylammonium
Trifluoromethanesulfonate $(CH_3)_2C_2H_5NH^+ + CF_3SO_3^-$ REFERENCE ELECTRODE:
  REVERSIBLE HYDROGEN ELECTRODE
COUNTER ELECTRODE: PLATINUM WIRE ELECTRODE
WORKING ELECTRODE: PLATINUM DISK ELECTRODE
  (OXYGEN GAS BUBBLING)
MEASUREMENT TEMPERATURE: 150°C
POTENTIAL SWEEP RATE: 10mV/S

FIG. 4

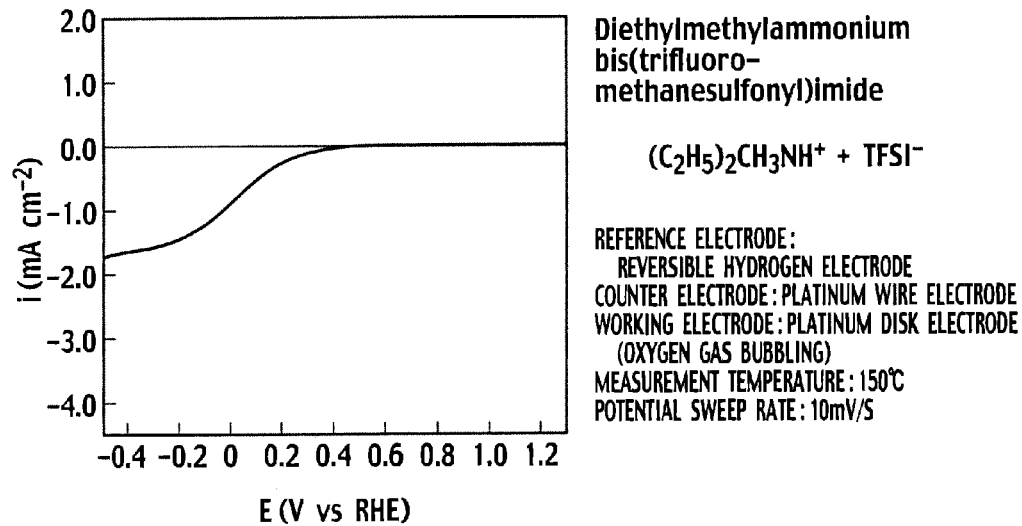

Diethylmethylammonium
bis(trifluoro-
methanesulfonyl)imide $(C_2H_5)_2CH_3NH^+ + TFSI^-$ REFERENCE ELECTRODE:
  REVERSIBLE HYDROGEN ELECTRODE
COUNTER ELECTRODE: PLATINUM WIRE ELECTRODE
WORKING ELECTRODE: PLATINUM DISK ELECTRODE
  (OXYGEN GAS BUBBLING)
MEASUREMENT TEMPERATURE: 150°C
POTENTIAL SWEEP RATE: 10mV/S

FIG. 5

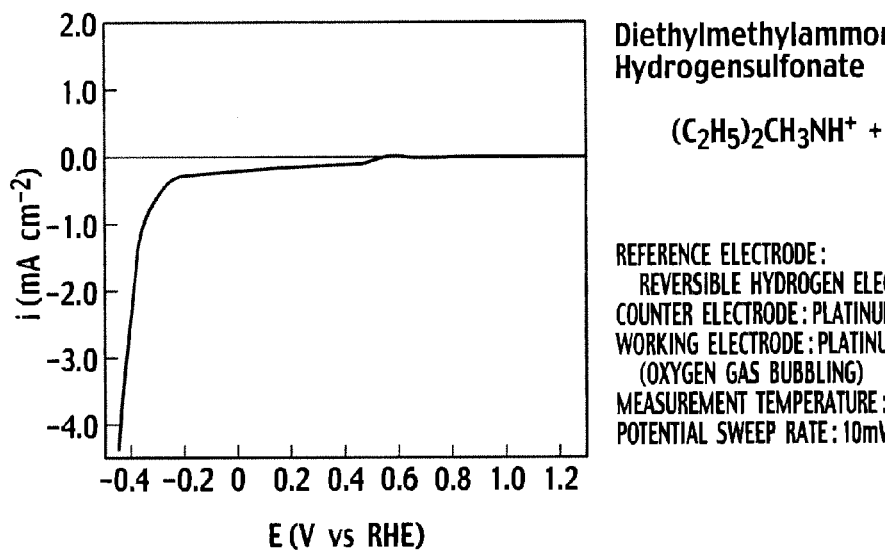

Diethylmethylammonium Hydrogensulfonate $(C_2H_5)_2CH_3NH^+ + HSO_4^-$

REFERENCE ELECTRODE:
  REVERSIBLE HYDROGEN ELECTRODE
COUNTER ELECTRODE: PLATINUM WIRE ELECTRODE
WORKING ELECTRODE: PLATINUM DISK ELECTRODE
  (OXYGEN GAS BUBBLING)
MEASUREMENT TEMPERATURE: 150°C
POTENTIAL SWEEP RATE: 10mV/S

FIG. 6

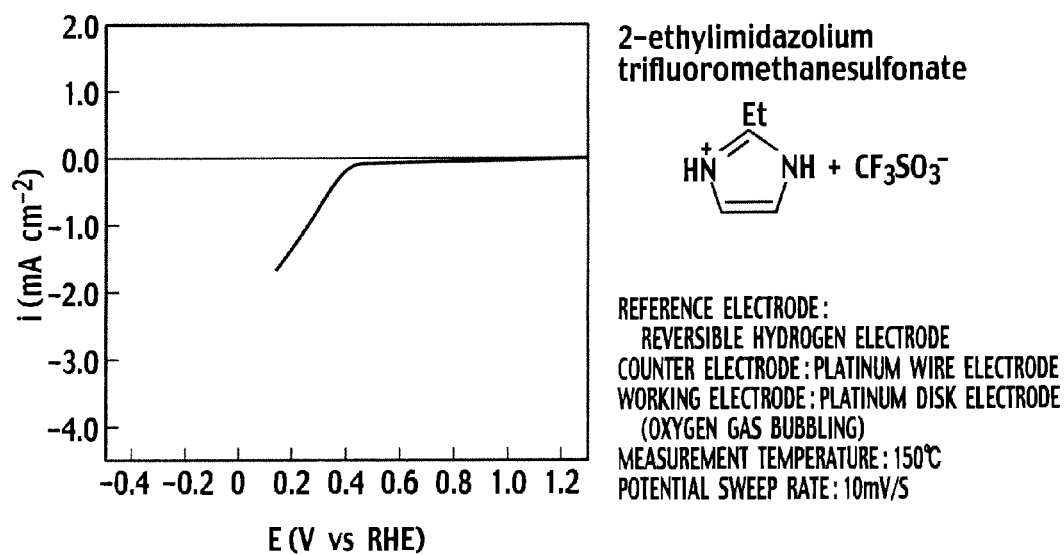

2-ethylimidazolium trifluoromethanesulfonate $HN^+{=}\!\langle\text{Et}\rangle\!{-}NH + CF_3SO_3^-$ REFERENCE ELECTRODE:
  REVERSIBLE HYDROGEN ELECTRODE
COUNTER ELECTRODE: PLATINUM WIRE ELECTRODE
WORKING ELECTRODE: PLATINUM DISK ELECTRODE
  (OXYGEN GAS BUBBLING)
MEASUREMENT TEMPERATURE: 150°C
POTENTIAL SWEEP RATE: 10mV/S

FIG. 7

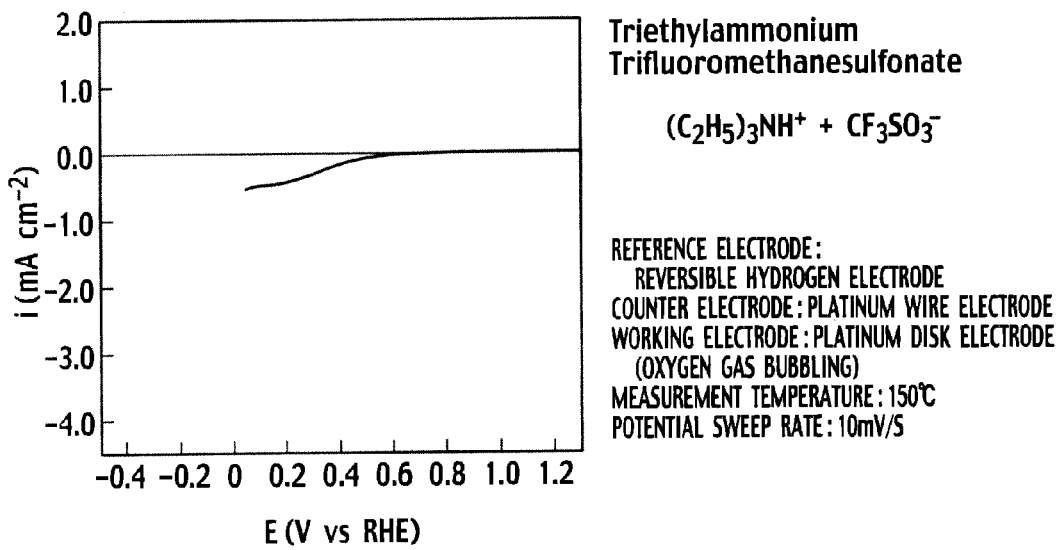

Triethylammonium Trifluoromethanesulfonate $(C_2H_5)_3NH^+ + CF_3SO_3^-$

REFERENCE ELECTRODE:
 REVERSIBLE HYDROGEN ELECTRODE
COUNTER ELECTRODE: PLATINUM WIRE ELECTRODE
WORKING ELECTRODE: PLATINUM DISK ELECTRODE
 (OXYGEN GAS BUBBLING)
MEASUREMENT TEMPERATURE: 150°C
POTENTIAL SWEEP RATE: 10mV/S

FIG. 8

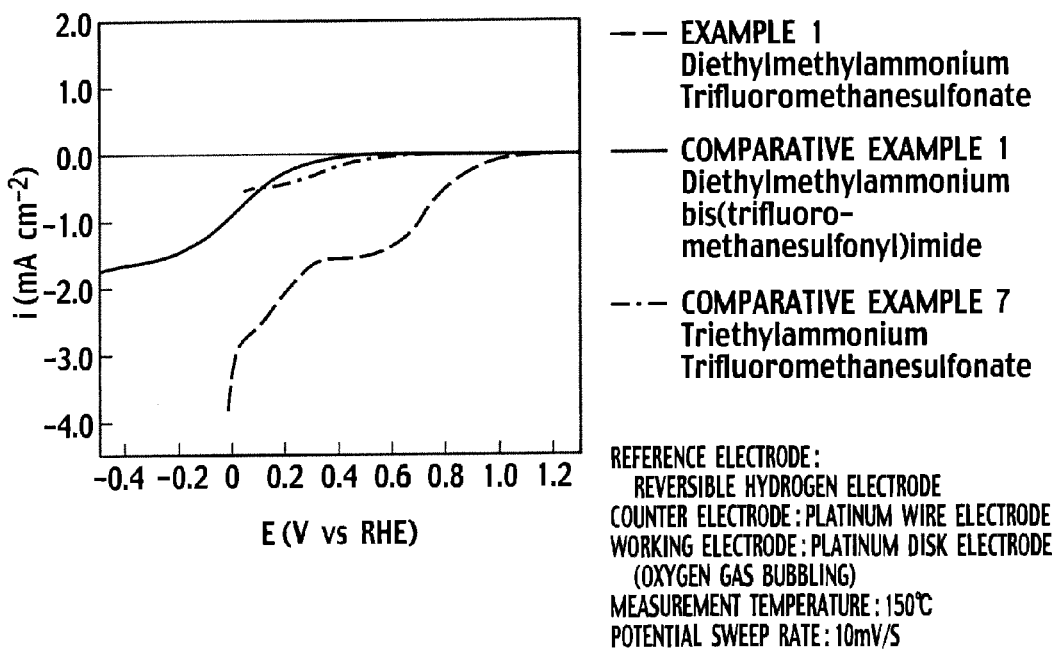

–– EXAMPLE 1
 Diethylmethylammonium
 Trifluoromethanesulfonate

— COMPARATIVE EXAMPLE 1
 Diethylmethylammonium
 bis(trifluoro-
 methanesulfonyl)imide –·– COMPARATIVE EXAMPLE 7
 Triethylammonium
 Trifluoromethanesulfonate REFERENCE ELECTRODE:
 REVERSIBLE HYDROGEN ELECTRODE
COUNTER ELECTRODE: PLATINUM WIRE ELECTRODE
WORKING ELECTRODE: PLATINUM DISK ELECTRODE
 (OXYGEN GAS BUBBLING)
MEASUREMENT TEMPERATURE: 150°C
POTENTIAL SWEEP RATE: 10mV/S

FIG. 11

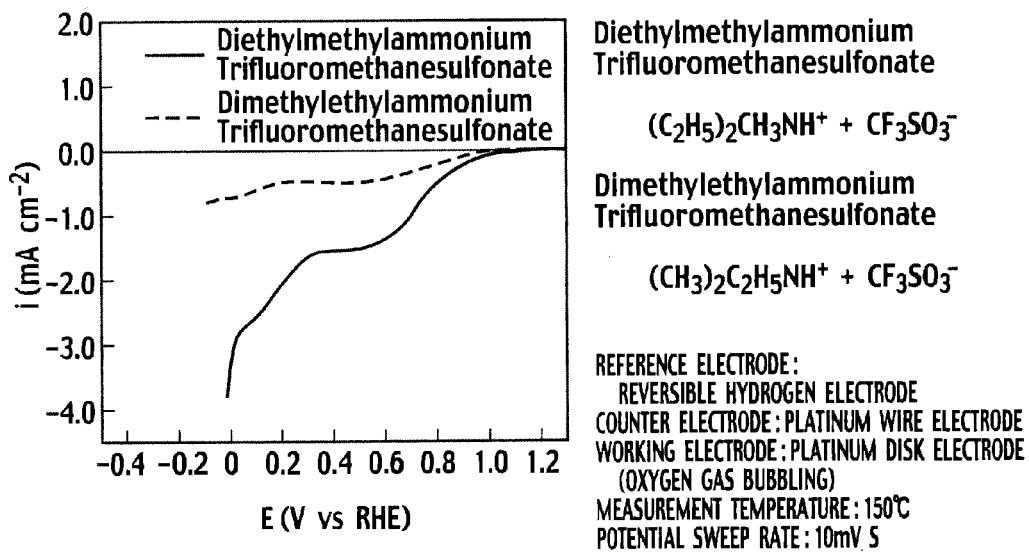

Diethylmethylammonium Trifluoromethanesulfonate $(C_2H_5)_2CH_3NH^+ + CF_3SO_3^-$ Dimethylethylammonium Trifluoromethanesulfonate $(CH_3)_2C_2H_5NH^+ + CF_3SO_3^-$ REFERENCE ELECTRODE:
   REVERSIBLE HYDROGEN ELECTRODE
COUNTER ELECTRODE: PLATINUM WIRE ELECTRODE
WORKING ELECTRODE: PLATINUM DISK ELECTRODE
   (OXYGEN GAS BUBBLING)
MEASUREMENT TEMPERATURE: 150°C
POTENTIAL SWEEP RATE: 10mV S

FIG. 12

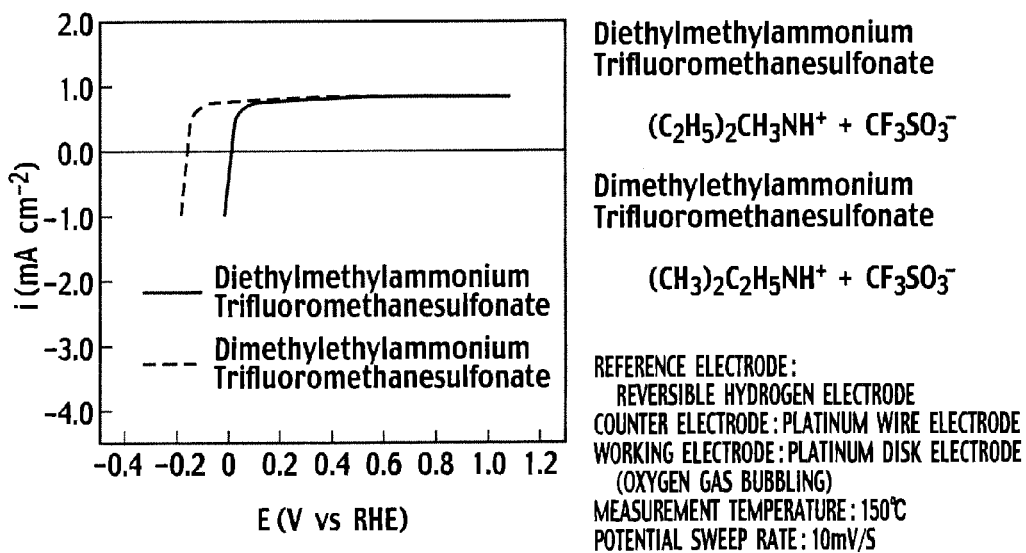

Diethylmethylammonium Trifluoromethanesulfonate $(C_2H_5)_2CH_3NH^+ + CF_3SO_3^-$ Dimethylethylammonium Trifluoromethanesulfonate $(CH_3)_2C_2H_5NH^+ + CF_3SO_3^-$ REFERENCE ELECTRODE:
   REVERSIBLE HYDROGEN ELECTRODE
COUNTER ELECTRODE: PLATINUM WIRE ELECTRODE
WORKING ELECTRODE: PLATINUM DISK ELECTRODE
   (OXYGEN GAS BUBBLING)
MEASUREMENT TEMPERATURE: 150°C
POTENTIAL SWEEP RATE: 10mV/S

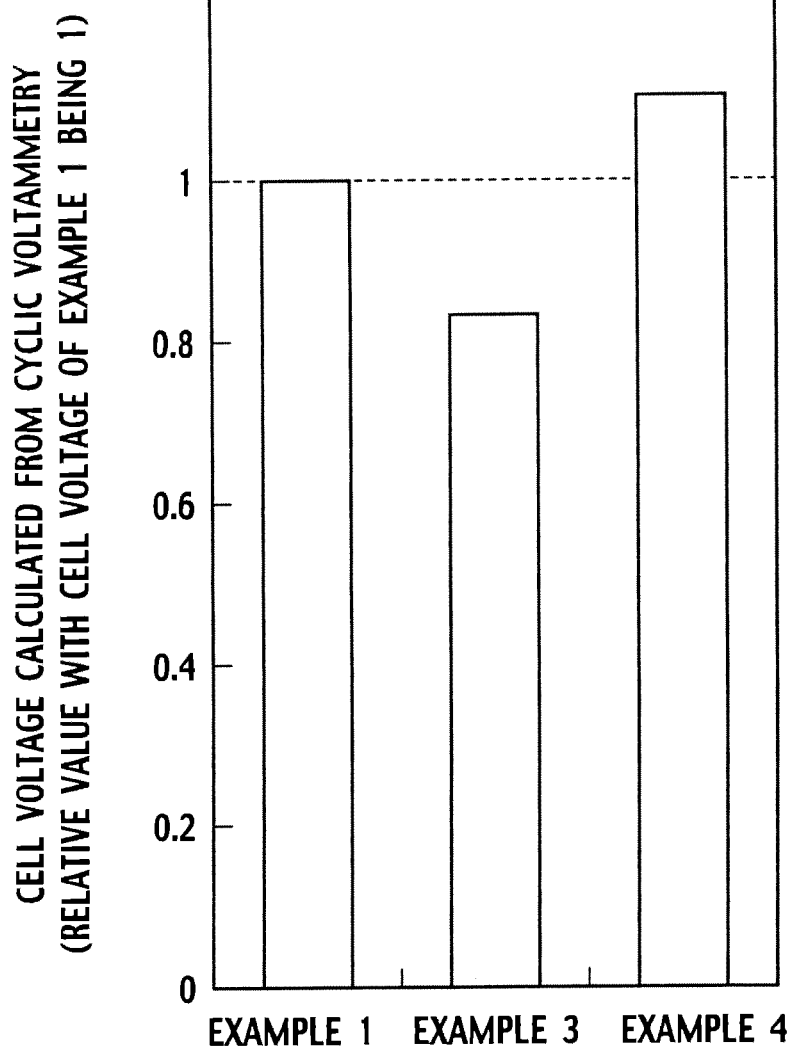

ELECTROCHEMICAL CELL AND FUEL CELL USING AN IONIC CONDUCTOR

CROSS REFERENCE TO RELATED APPLICATIONS

The present application is a divisional of U.S. application Ser. No. 11/976,609, filed on Oct. 25, 2007 (now U.S. Pat. No. 8,071,253, issued Dec. 6, 2011), which claims priority from Japanese Patent Application No. 2006-291956, filed Oct. 27, 2006 and Japanese Patent Application No. 2007-169028, filed Jun. 27, 2007. The subject matter of each of the above-referenced applications is incorporated by reference in their entirety.

BACKGROUND OF THE INVENTION

1. Field of the Invention

The present invention relates to an electrochemical cell and a fuel cell using the same. More specifically, the present invention relates to an electrochemical cell which is applicable to an energy device such as a fuel cell, a lithium ion cell, or a dye-sensitized solar cell and a fuel cell using the same.

2. Description of the Related Art

In recent years, solving environmental and energy problems is a significant challenge in countries consuming a lot of energy.

Fuel cells, which have high power generation efficiency and are excellent in reducing environmental burden, are next-generation energy supply devices expected to contribute to the solution of these problems. Moreover, the fuel cells are classified by the types of electrolyte, among which polymer electrolyte fuel cells are small and can provide high power. Accordingly, studies and developments are being conducted in applications of the polymer electrolyte fuel cells to small-scale stationary energy sources and energy sources for movable bodies and mobile phones.

Such solid polymer electrolyte is a material including a hydrophilic functional group such as a sulfonic acid group or a phosphoric acid group in a polymer chain. The solid polymer electrolyte is tightly bound to particular ions and has a property of selectively transmitting anions or cations. The solid polymer electrolyte is therefore shaped into particles, fibers, or membranes and utilized for various applications such as electrodialysis, diffusion dialysis and battery diaphragms.

The polymer electrolyte fuel cells are being increasingly improved at present as power generation means which can provide a high total energy efficiency. The main constituent elements thereof are both electrodes of an anode and a cathode, a separator plate forming a gas passage and a solid polymer electrolyte membrane which separates the both electrodes. Protons produced on a catalyst of the anode move inside the solid polymer electrolyte membrane and reach a catalyst of the cathode to react with oxygen. Resistance to ionic conduction between the both electrodes therefore significantly affects cell performances.

To form a fuel cell using the aforementioned solid polymer electrolyte membrane, it is necessary to connect the catalysts of the both electrodes and the solid polymer electrolyte membrane by means of an ion conduction path. The electrodes therefore include catalyst layers formed by mixing a polymer electrolyte solution and catalyst particles for applying and drying to bind the same. Such electrodes and a solid polymer electrolyte membrane are then heated and pressed, thus obtaining the fuel cell.

The polymer electrolyte which plays a role in ionic conduction generally includes a polymer having a sulfonic acid group introduced into a perfluorocarbon main chain. Specific commercial products thereof are Nafion (DuPont Kabushiki Kaisha), Flemion (Asahi Glass Co., Ltd.), Aciplex (Asahi Kasei Corporation), and the like.

The perfluorosulfonic acid polymer electrolyte is composed of main chains of perfluorocarbon and side chains each including a sulfonic acid group. The polymer electrolyte is considered to be microphase-separated into a region mainly composed of the sulfonic acid groups and a region mainly composed of the perfluorocarbon main chains, and the phase of the sulfonic acid groups forms a cluster. The part of the perfluorocarbon main chains aggregated contributes to chemical stability of the perfluorosulfonic acid electrolyte membrane. The part in which the sulfonic acid groups aggregate to form a cluster contributes to the ionic conduction.

However, such a perfluorosulfonic acid electrolyte membrane having both excellent chemical stability and ionic conductivity is difficult to manufacture and has a disadvantage of being very expensive. The perfluorosulfonic acid electrolyte membrane has therefore limited use and is very difficult to apply to polymer electrolyte fuel cells which are expected as power sources for movable bodies.

Moreover, current polymer electrolyte fuel cells are operated in a comparatively low temperature range of about 80° C. This is because the used fluorine membrane, which has a glass transition point around 120 to 130° C., cannot maintain the ion channel structure contributing to proton conduction in a range of temperature higher than the glass transition point and is substantially desired to be used at a temperature of not higher than 100° C. As another reason, since water is used as a proton conducting medium, pressurization is required when the temperature exceeds 100° C., which is a boiling point of water, thus increasing the apparatus size.

When the operation temperature is low, the power generation efficiency of the fuel cell is low, and the catalyst is notably poisoned by carbon monoxide. When the operation temperature is 100° C. or more, the power generation efficiency is increased, and furthermore, waste heat can be utilized, enabling efficient use of energy. Considering applications to fuel cell vehicles, if the operation temperature can be raised to 120° C., the power generation efficiency can be increased, and moreover, radiator load necessary to exhaust heat can be reduced. It is therefore possible to apply a radiator of the same specifications as those of the radiators used in current mobile bodies, thus reducing the system size.

As described above, to realize operation at higher temperature, various examinations have been made. Typically, as an action with an eye to reducing cost of the aforementioned electrolyte, considerations are being made for applications of aromatic hydrocarbon polymer materials, which are cheap and excellent in heat resistance, to the solid polymer electrolyte instead of the fluorine membranes.

For example, as the material of the solid polymer electrolyte, various types of aromatic hydrocarbon are being examined, such as sulfonated polyether ether ketone, sulfonated polyether sulfone, sulfonated polyether ether sulfone, sulfonated polysulfide, and polybenzimidazol (see the Japanese Patent Unexamined Publication Nos. H6-93114, H9-245818, H11-116679, H11-67224, and H9-73908 and the Japanese Patent Translation Publication No. H11-510198). However, water is used as the proton conducting medium also in the aforementioned polymer electrolytes. Accordingly, when the operation temperature exceeds 100° C., which is the boiling point of water, pressurization is required, and the apparatus size is increased.

Furthermore, it was proposed to apply an electrolyte including an ionic liquid to a fuel cell as an electrolyte allowing proton conduction under conditions of high temperature and no humidification (see the Japanese Patent Unexamined Publication No. 2003-123791). Using the ionic liquid for the electrolyte of the fuel cell can provide high proton conductance without depending on water.

Still furthermore, it was proposed to apply to a fuel cell an electrolyte including a protic ionic liquid composed of alkylamine and oxo-acid both have same alkyl groups (see Nakamoto Hirohumi, Matsuoka Hideyuki, and Watanabe Masayoshi, "Properties of protic ionic liquids consisting of alkyl amines and oxo-acids", Abstracts of the 73th Meeting of the Electrochemical Society of Japan, 2006, P147).

BRIEF SUMMARY OF THE INVENTION

However, in addition to the high proton conductance, the electrolyte needs high activities of hydrogen oxidation reaction in the anode and oxygen reduction reaction in the cathode. However, using the ionic liquid as the electrolyte, especially the oxygen reduction activity is low.

The present invention was made in the light of the problems of the conventional arts, and an object thereof is to provide an electrochemical cell using an ionic conductor which allows proton conduction under conditions of high temperature and no humidification and has high activities in hydrogen oxidation and oxygen reduction reactions and provide a fuel cell using the same.

The first aspect of the present invention provides an electrochemical cell comprising: an anode; a cathode; and an electrolyte membrane having one side bonded to the anode and the other side bonded to the cathode and containing an ionic conductor,
   wherein the ionic conductor comprises:
   (a) a cation expressed by one of Formulae (1) and (2):

$$R_1R_2R_3HX^+ \tag{1}$$

where, in Formula (1), X indicates any one of N and P, and $R_1$, $R_2$ and $R_3$ each indicate any one of alkyl groups C1 to C18 except a structure in which $R_1=R_2=R_3$, $$R_1R_2HS^+ \tag{2}$$

where, in Formula (2), $R_1$ and $R_2$ each indicate any one of alkyl groups C1 to C18 except a structure in which $R_1=R_2$; and
   (b) an anion expressed by Formula (3):

$$R_4YO_m(OH)_{n-1}O^- \tag{3}$$

where, in Formula (3), Y indicates any one of S, C, N and P, $R_4$ indicates any one of an alkyl group and a fluoroalkyl group, and m and n each indicate any one of 1 and 2.

The second aspect of the present invention provides an electrochemical cell comprising: an anode; a cathode; and an electrolyte membrane having one side bonded to the anode and the other side bonded to the cathode and containing an ionic conductor,
   wherein the ionic conductor comprises:
   (a) a cation expressed by one of Formulae (4) and (5):

$$R_5R_6H_2X^+ \tag{4}$$

where, in Formula (4), X indicates any one of N and P, and $R_5$ and $R_6$ each indicate any one of alkyl groups C1 to C18 except a structure in which $R_5=R_6$, $$R_5H_2S^+ \tag{5}$$

where, in Formula (5), $R_5$ indicates any one of alkyl groups C1 to C18; and
   (b) an anion expressed by Formula (6):

$$R_7YO_m(OH)_{n-1}O^- \tag{6}$$

where, in Formula (6), Y indicates any one of S, C, N and P, $R_7$ indicates any one of an alkyl group and a fluoroalkyl group, and m and n each indicate any one of 1 and 2.

The third aspect of the present invention provides an electrochemical cell comprising: an anode; a cathode; and an electrolyte membrane having one side bonded to the anode and the other side bonded to the cathode and containing an ionic conductor,
   wherein the ionic conductor comprises:
   (a) a cation expressed by Formula (7):

$$R_8H_3X^+ \tag{7}$$

where, in Formula (7), X indicates any one of N and P, and $R_8$ indicates any one of alkyl groups C1 to C18; and
   (b) an anion expressed by Formula (8):

$$R_9YO_m(OH)_{n-1}O^- \tag{8}$$

where, in Formula (8), Y indicates any one of S, C, N and P, $R_9$ indicates any one of an alkyl group and a fluoroalkyl group, and m and n each indicate any one of 1 and 2.

The fourth aspect of the present invention provides an electrochemical cell comprising: an anode; a cathode; and an electrolyte membrane having one side bonded to the anode and the other side bonded to the cathode and containing an ionic conductor,
   wherein the ionic conductor comprises:
   (a) a cation expressed by Formula (9):

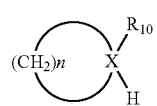

(9)

where Formula (9) indicates an aliphatic heterocyclic compound containing X as an element other than carbon, in which X indicates any one of N and P, $R_{10}$ indicates any one of alkyl groups C1 to C18, and n indicates any one of 3 to 18; and
   (b) an anion expressed by Formula (10):

$$R_{11}YO_m(OH)_{n-1}O^- \tag{10}$$

where, in Formula (10), Y indicates any one of S, C, N and P, $R_{11}$ indicates any one of an alkyl group and a fluoroalkyl group, and m and n each indicate any one of 1 and 2.

The fifth aspect of the present invention provides an electrochemical cell comprising: an anode; a cathode; and an electrolyte membrane having one side bonded to the anode and the other side bonded to the cathode and containing at least two types of ionic conductors different from each other,
   wherein each of the ionic conductors comprises:
   (a) any one of:
   (i) a cation expressed by any one of Formulae (1) and (2):

$$R_1R_2R_3HX^+ \tag{1}$$

where, in Formula (1), X indicates any one of N and P, and $R_1$, $R_2$ and $R_3$ each indicate any one of alkyl groups C1 to C18 except a structure in which $R_1=R_2=R_3$, $$R_1R_2HS^+ \tag{2}$$

where, in Formula (2), $R_1$ and $R_2$ each indicate any one of alkyl groups C1 to C18 except a structure in which $R_1=R_2$;

(ii) a cation expressed by any one of Formulae (4) and (5):

$$R_5R_6H_2X^+ \qquad (4)$$

where, in Formula (4), X indicates any one of N and P, and $R_5$ and $R_6$ each indicate any one of alkyl groups C1 to C18 except a structure in which $R_5=R_6$, $$R_5H_2S^+ \qquad (5)$$

where, in Formula (5), $R_5$ indicates any one of alkyl groups C1 to C18;

(iii) a cation expressed by Formula (7):

$$R_8H_3X^+ \qquad (7)$$

where, in Formula (7), X indicates any one of N and P, and $R_8$ indicates any one of alkyl groups C1 to C18; and (iv) a cation expressed by Formula (9):

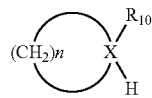
(9)

where, Formula (9) indicates an aliphatic heterocyclic compound containing X as an element other than carbon, in which X indicates any one of N and P, $R_{10}$ indicates any one of alkyl groups C1 to C18, and n indicates any one of 3 to 18; and (b) an anion expressed by Formula (3):

$$R_4YO_m(OH)_{n-1}O^- \qquad (3)$$

where, in Formula (3), Y indicates any one of S, C, N and P; $R_4$ indicates any one of an alkyl group and a fluoroalkyl group; and m and n each indicate any one of 1 and 2, and wherein one of the at least two types of ionic conductors has the highest oxygen reduction activity among the at least two types of ionic conductors and the other type of ionic conductor has a higher hydrogen oxidation activity than the ionic conductor having the highest oxygen reduction activity.

BRIEF DESCRIPTION OF THE SEVERAL VIEWS OF THE DRAWING

FIG. 1 is a graph showing a result of cyclic voltammetry measurements (an oxygen reduction reaction) of Example 1.

FIG. 2 is a graph showing a result of cyclic voltammetry measurements (an oxygen reduction reaction) of Example 2.

FIG. 3 is a graph showing a result of cyclic voltammetry measurements (an oxygen reduction reaction) of Example 3.

FIG. 4 is a graph showing a result of cyclic voltammetry measurements (an oxygen reduction reaction) of Comparative Example 1.

FIG. 5 is a graph showing a result of cyclic voltammetry measurements (an oxygen reduction reaction) of Comparative Example 2.

FIG. 6 is a graph showing a result of cyclic voltammetry measurements (an oxygen reduction reaction) of Comparative Example 3.

FIG. 7 is a graph showing a result of cyclic voltammetry measurements (an oxygen reduction reaction) of Comparative Example 7.

FIG. 8 is a graph showing the results of the cyclic voltammetry measurements (oxygen reduction reactions) of Example 1 and Comparative Examples 1 and 7.

FIG. 11 is a graph showing a result of cyclic voltammetry measurements (an oxygen reduction reaction) of Example 4.

FIG. 12 is a graph showing a result of cyclic voltammetry measurements (a hydrogen oxidation reaction) of Example 4.

FIG. 13 is a graph showing measurement results of cell voltage of the fuel cells of Examples 1, 3 and 4.

DETAILED DESCRIPTION OF THE INVENTION

Hereinafter, description will be made of embodiments of the present invention with reference to the drawings.

Figure 14:
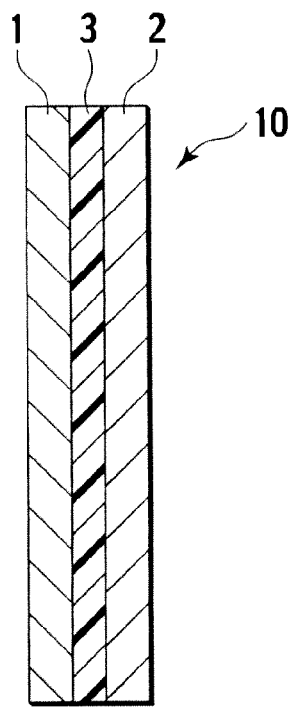
FIG. 14 is a schematic view showing an electrochemical cell according to embodiments of the present invention.

As shown in FIG. 14, an electrochemical cell 10 of the present invention includes: an anode 1; a cathode 2; and an electrolyte membrane 3 which has one side bonded to the anode 1 and the other side bonded to the cathode 2 and contains an ionic conductor. The electrolyte membrane 3 is composed of an electrolyte which contains the ionic conductor including a combination of a cation and an anion. The electrochemical cell of the present invention is broadly classified into one of the following first to fourth electrochemical cells by the types of the cation and anion.

In the first electrochemical cell, the ionic conductor includes: a cation expressed by Formula (1) or (2)

$$R_1R_2R_3HX^+ \qquad (1)$$

(in Formula (1), X indicates any one of N (nitrogen) and P (phosphorous), and $R_1$, $R_2$ and $R_3$ each indicate any one of alkyl groups C1 to C18 except a structure in which $R_1=R_2=R_3$)

$$R_1R_2HS^+ \qquad (2)$$

(in Formula (2), $R_1$ and $R_2$ each indicate any one of alkyl groups C1 to C18 except a structure in which $R_1=R_2$); and an anion expressed by Formula (3)

$$R_4YO_m(OH)_{n-1}O^- \qquad (3)$$

(in Formula (3), Y indicates any one of S (sulfur), C (carbon), N and P; $R_4$ indicates any one of an alkyl group and a fluoroalkyl group; and m and n each indicate any one of 1 and 2).

In other words, the first electrochemical cell uses an ionic conductor which includes a tertiary alkyl cation and an anion composed of an oxo-acid having any one of an alkyl group and fluoroalkyl group. Herein, the tertiary alkyl cation does not have a structure in which all the alkyl groups of the alkyl cation are the same.

In the second electrochemical cell, the ionic conductor includes: a cation expressed by Formula (4) or (5)

$$R_5R_6H_2X^+ \qquad (4)$$

(in Formula (4), X indicates any one of N and P, and $R_5$ and $R_6$ each indicate any one of alkyl groups C1 to C18 except a structure in which $R_5=R_6$)

$$R_5H_2S^+ \qquad (5)$$

(in Formula (5), $R_5$ indicates any one of alkyl groups C1 to C18); and an anion expressed by Formula (6)

$$R_7YO_m(OH)_{n-1}O^- \quad (6)$$

(in Formula (6), Y indicates any one of S, C, N and P; $R_7$ indicates any one of an alkyl group and a fluoroalkyl group; and m and n each indicate any one of 1 and 2).

In other words, the second electrochemical cell uses an ionic conductor which includes a secondary alkyl cation and an anion composed of an oxo-acid having any one of an alkyl group and a fluoroalkyl group. Herein, the secondary alkyl cation does not have a structure in which the two alkyl groups of the alkyl cation are the same.

In the third electrochemical cell, the ionic conductor includes: a cation expressed by Formula (7)

$$R_8H_3X^+ \quad (7)$$

(in Formula (7), X indicates any one of N and P, and $R_8$ indicates any one of alkyl groups C1 to C18); and an anion expressed by Formula (8)

$$R_9YO_m(OH)_{n-1}O^- \quad (8)$$

(in Formula (8), Y indicates any one of S, C, N and P; $R_9$ indicates any one of an alkyl group and a fluoroalkyl group; and m and n each indicate any one of 1 and 2).

In other words, the third electrochemical cell uses an ionic conductor which includes a primary alkyl cation and an anion composed of an oxo-acid having any one of an alkyl group and a fluoroalkyl group.

Next, in the fourth electrochemical cell, the ionic conductor includes: a cation expressed by Formula (9)

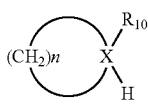
(9)

(Formula (9) indicates an aliphatic heterocyclic compound containing X as an element other than carbon, in which X indicates any one of N and P, $R_{10}$ indicates any one of alkyl groups C1 to C18, and n indicates any one of 3 to 18); and an anion expressed by Formula (10)

$$R_{11}YO_m(OH)_{n-1}O^- \quad (10)$$

(in Formula (10), Y indicates any one of S, C, N and P; $R_{11}$ indicates any one of an alkyl group and a fluoroalkyl group; and m and n each indicate any one of 1 and 2).

In other words, the fourth electrochemical cell uses an ionic conductor in which the cation is composed of an aliphatic heterocyclic compound and an anion is composed of an oxo-acid having any one of an alkyl group and a fluoroalkyl group.

As described above, in each of the first to fourth electrochemical cells of the present invention, using the electrolyte containing the ionic conductor enables proton conduction under conditions of high temperature and no humidification and can provide high activity in the oxygen reduction reaction. Moreover, the electrolyte includes the anion which is composed of the oxo-acid having any one of an alkyl group and a fluoroalkyl group and therefore has high resistance to heat. Furthermore, the electrolyte is composed of a material cheaper than fluorine polymer electrolytes and is therefore cheaper and suitable for widespread use.

Herein, in the aforementioned first to fourth electrochemical cells of the present invention, preferably, the alkyl groups ($R_1$, $R_2$, $R_3$, $R_5$, $R_6$, $R_8$ and $R_{10}$) of the above cations are C1 to C18, or n is any one of 1 to 18 in a general formula $C_nH_{2n+1}$—. From the perspective of increasing the activity in the oxygen reduction reaction, it is preferable that the alkyl groups ($R_1$, $R_2$, $R_3$, $R_5$, $R_6$, $R_8$ and $R_{10}$) of the above cations are C1 to C6, that is, n is any one of 1 to 6 in a general formula $C_nH_{2n+1}$—. Specifically, the alkyl groups of the cations being C1 to C6 facilitates supplying protons to platinum used for the electrode and the like, thus increasing the oxygen reduction activity. Moreover, when the alkyl groups are C1 to C6, the ion density is high, and high proton conductance can be obtained.

Moreover, in the fourth electrochemical cell of the present invention, from the perspective of increasing the activities of the oxidation and reduction reactions, preferably, the number of carbon atoms constituting a ring of the aliphatic heterocyclic compound is not more than 6.

Furthermore, in each of the first to fourth electrochemical cells of the present invention, from the perspective of increasing the activities of the oxidation and reduction reactions, preferably, the alkyl or fluoroalkyl group ($R_4$, $R_7$, $R_9$ and $R_{11}$) of the anion is any one of $CH_3$, $CH_2F$, $CHF_2$ and $CF_3$. Especially when the fluoroalkyl group of the anion is $CF_3$, it is possible to provide an extremely excellent oxygen reduction activity.

Still furthermore, in each of the first and second electrochemical cells of the present invention, from the perspective of increasing the activities of the oxidation and reduction reactions, it is preferable to use a cation expressed by Formula (11)

$$(CH_3)(C_2H_5)R_{12}HX \quad (11)$$

(in Formula (11), X indicates any one of N and P, and $R_{12}$ indicates any one of H and alkyl groups C1 to C6).

More preferably, $R_{12}$ of Formula (11) is any one of H, $CH_3$ and $C_2H_5$. Specifically, for example, it is possible to use a cation expressed by Formula (12)

$$(CH_3)(C_2H_5)_2HX^+ \quad (12)$$

(in Formula (12), X indicates any one of N and P). It is more preferable to use especially a cation expressed by Formula (13).

$$(CH_3)(C_2H_5)_2HN^+ \quad (13)$$

In the third electrochemical cell of the present invention, from the perspective of increasing the activities in the oxidation and reduction reactions, it is preferable to use a cation expressed by Formula (14) or (15)

$$(C_2H_5)H_3X^+ \quad (14)$$

(in Formula (14), X indicates any one of N and P).

$$(C_2H_5)H_3S^+ \quad (15)$$

Specifically, it is more preferable to use a cation expressed by Formula (16).

$$(C_2H_5)H_3N^+ \quad (16)$$

In the fourth electrochemical cell of the present invention, from the perspective of increasing the activities in the oxidation and reduction reactions, it is preferable to use a cation expressed by Formula (17) or (18).

(17)

(in Formula (17), X indicates any one of N and P)

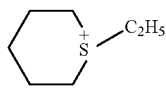
(18)

Specifically, it is more preferable to use a cation expressed by Formula (19).

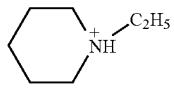
(19)

A fifth electrochemical cell of the present invention is an electrochemical cell using an electrolyte which contains at least two types of ionic conductors different from each other. Each of the ionic conductors includes any one of: a cation expressed by Formula (1) or (2)

$$R_1R_2R_3HX^+ \qquad (1)$$

(in Formula (1), X indicates any one of N and P, and $R_1$, $R_2$ and $R_3$ each indicate any one of alkyl groups C1 to C18 except a structure in which $R_1=R_2=R_3$)

$$R_1R_2HS^+ \qquad (2)$$

(in Formula (2), $R_1$ and $R_2$ each indicate any one of alkyl groups C1 to C18 except a structure in which $R_1=R_2$); a cation expressed by Formula (4) or (5)

$$R_5R_6H_2X^+ \qquad (4)$$

(in Formula (4), X indicates any one of N and P, and $R_5$ and $R_6$ each indicate any one of alkyl groups C1 to C18 except a structure in which $R_5=R_6$)

$$R_5H_2S^+ \qquad (5)$$

(in Formula (5), $R_5$ indicates any one of alkyl groups C1 to C18); a cation expressed by Formula (7)

$$R_8H_3X^+ \qquad (7)$$

(in Formula (7), X indicates any one of N and P, and $R_8$ indicates any one of alkyl groups C1 to C18); and a cation expressed by Formula (9)

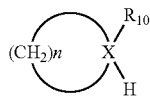
(9)

(Formula (9) indicates an aliphatic heterocyclic compound containing X as an element other than carbon, in which X indicates any one of N and P, $R_{10}$ indicates any one of alkyl groups C1 to C18, and n indicates any one of 3 to 18). The ionic conductor further includes an anion expressed by Formula (3) (=(6)=(8)=(10))

$$R_4YO_m(OH)_{n-1}O^- \qquad (3)$$

(in Formula (3), Y indicates any one of S, C, N and P; $R_4$ indicates any one of an alkyl group and a fluoroalkyl group; and m and n each indicate any one of 1 and 2).

Herein, the "two types of ionic conductors different from each other" indicate ionic conductors which include different cation species and are different from each other in terms of the oxygen reduction and hydrogen oxidation activities. The anion species thereof may be either the same or different. Similarly in the case of three or more types of ionic conductors different from one another, the ionic conductors include different cation species and are therefore different in terms of the oxygen reduction and hydrogen oxidation activities, and the anion species may be either the same or different.

Furthermore, in the fifth electrochemical cell, one of the at least two types of ionic conductors is an ionic conductor having the highest oxygen reduction activity among the at least two types of ionic conductors, and the other type is an ionic conductor having a hydrogen oxidation activity higher than that of the ionic conductor having the highest oxygen reduction activity.

In the fifth electrochemical cell, the ionic conductor having the highest oxygen reduction activity among the at least two types of ionic conductors contained in the electrolyte and the other type of ionic conductor having a hydrogen oxidation activity higher than that of the above ionic conductor having the highest oxygen reduction activity are selected and allowed to coexist. It is therefore possible to utilize the characteristics of both the ionic conductor excellent in oxygen reduction activity and ionic conductor excellent in hydrogen oxidation activity. Accordingly, the aforementioned electrolyte is highly active both in oxygen reduction and hydrogen oxidation, which is preferable.

The selection of the ionic conductors can be made by comparing ionic conductors in terms of electrochemical reactivity in interfaces with the electrodes. Specifically, the comparison is performed by cyclic voltammetry measurements using a three-electrode cell in which the reference electrode is a reversible hydrogen electrode. As for the oxygen reduction activity, potential scanning is performed with a working electrode being in an atmosphere of bubbling oxygen gas for comparison of reduction current due to the oxygen reduction reaction. As for the hydrogen oxidation activity, potential scanning is performed with the working electrode being in an atmosphere of bubbling hydrogen gas for comparison of oxidation current due to the hydrogen oxidation reaction. Based on the measurement results of the oxygen reduction and hydrogen oxidation activities, the ionic conductor having the highest oxygen reduction activity and the ionic conductor having the highest hydrogen oxidation activity can be selected. By including these ionic conductors, an electrolyte which is highly active both in oxygen reduction and hydrogen oxidation can be obtained.

Furthermore, a sixth electrochemical cell of the present invention is an electrochemical cell using an electrolyte which contains two types of ionic conductors different from each other. Each of the ionic conductors includes any one of: a cation expressed by Formula (1) or (2)

$$R_1R_2R_3HX^+ \qquad (1)$$

(in Formula (1), X indicates any one of N and P, and $R_1$, $R_2$ and $R_3$ each indicate any one of alkyl groups C1 to C18 except a structure in which $R_1=R_2=R_3$)

$$R_1R_2HS^+ \qquad (2)$$

(in Formula (2), $R_1$ and $R_2$ each indicate any one of alkyl groups C1 to C18 except a structure in which $R_1=R_2$); a cation expressed by Formula (4) or (5)

$$R_5R_6H_2X^+ \qquad (4)$$

(in Formula (4), X indicates any one of N and P, and $R_5$ and $R_6$ each indicate any one of alkyl groups C1 to C18 except a structure in which $R_5=R_6$)

$$R_5H_2S^+ \qquad (5)$$

(in Formula (5), $R_5$ indicates any one of alkyl groups C1 to C18); a cation expressed by Formula (7)

$$R_8H_3X^+ \quad (7)$$

(in Formula (7), X indicates any one of N and P, and $R_8$ indicates any one of alkyl groups C1 to C18); and a cation expressed by Formula (9)

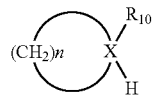
(9)

(Formula (9) indicates an aliphatic heterocyclic compound containing X as an element other than carbon, in which X indicates any one of N and P, $R_{10}$ indicates any one of alkyl groups C1 to C18, and n indicates any one of 3 to 18). The ionic conductor further contains an anion expressed by Formula (3) (=(6)=(8)=(10))

$$R_4YO_m(OH)_{n-1}O^- \quad (3)$$

(in Formula (3), Y indicates any one of S, C, N and P; $R_4$ indicates any one of an alkyl group and a fluoroalkyl group; and m and n each indicate any one of 1 and 2).

Furthermore, in the sixth electrochemical cell, one of the two types of ionic conductors is an ionic conductor having a relatively high oxygen reduction activity, and the other type is a different type of ionic conductor having a relatively higher hydrogen oxidation activity than that of the ionic conductor having a relatively high oxygen reduction activity.

In the sixth electrochemical cell, the ionic conductor having a relatively higher oxygen reduction activity among the ionic conductors contained in the electrolyte and the different type of ionic conductor having a relatively higher hydrogen oxidation activity than that of the above ionic conductor having a relatively higher oxygen reduction activity are selected and allowed to coexist. It is therefore possible to utilize the characteristics of both the ionic conductor excellent in oxygen reduction activity and the ionic conductor excellent in hydrogen oxidation activity. Accordingly, the aforementioned electrolyte is active both in oxygen reduction and hydrogen oxidation, which is preferable.

Still furthermore, a seventh electrochemical cell of the present invention is the aforementioned sixth electrochemical cell in which the content of the ionic conductor having relatively high oxygen reduction activity is not less than 50 mol %. By containing both the aforementioned two types of ionic conductors, the ionic liquid can be used as an electrolyte, and furthermore, by containing the ionic conductor excellent in oxygen reduction activity of not less than 50 mol %, the oxygen reduction activity can be effectively increased. Accordingly, the aforementioned electrolyte is excellent both in oxygen reduction and hydrogen oxidation activities, which is preferable.

Similarly in the aforementioned fifth to seventh electrochemical cells, it is preferable that the alkyl groups ($R_1$, $R_2$, $R_3$, $R_5$, $R_6$, $R_8$ and $R_{10}$) of the above cations are C1 to C6, and it is preferable that the number of carbon atoms constituting a ring of the aliphatic heterocyclic compound is not more than 6. Furthermore, it is preferable that the alkyl or fluoroalkyl group ($R_4$) of the anion is any one of $CH_3$, $CH_2F$, $CHF_2$ and $CF_3$. Still furthermore, it is preferable that the above cations are the cations expressed by Formulae (11) to (19).

Next, a description is given of a fuel cell of the present invention. Any one of the aforementioned electrochemical cells is applied to the fuel cell of the present invention. Typically, an electrolyte membrane to which any one of the electrolytes including the aforementioned ionic conductors is applied can be used in the fuel cell and a system thereof. This allows for operation in an intermediate temperature range (about 120° C.). The radiator load can be therefore reduced to be smaller than that of conventional PEM fuel cells, and the radiator size can be reduced. Accordingly, the system can be reduced in size and weight.

Figure 15:
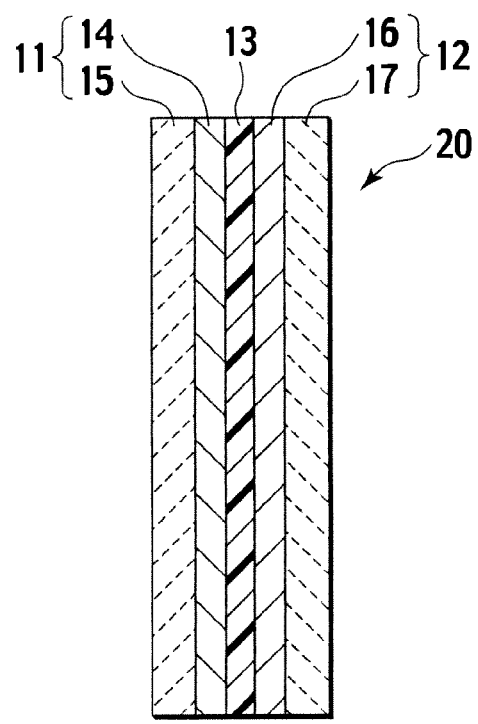
FIG. 15 is a schematic view showing a fuel cell according to the embodiments of the present invention.

An example of the fuel cell of the present invention is shown in FIG. 15. A fuel cell 20 of the present invention includes a fuel electrode (anode) 11; an air electrode (cathode) 12; and an electrolyte membrane 13 which has one side bonded to the fuel electrode 11 and the other side bonded to the air electrode 12 and contains any one of the aforementioned ionic conductors. The fuel electrode 11 includes: a first catalytic electrode layer 14 which contains highly-dispersed noble metal catalyst or the like and thereby promotes the oxidation reaction of hydrogen as a fuel; and a porous first gas diffusion layer 15 which performs power collection and diffusion of hydrogen gas. The air electrode 12 includes: a second catalytic electrode layer 16 which contains highly dispersed noble metal catalyst or the like and thereby promotes the oxygen reduction reaction; and a porous second gas diffusion layer 17 which performs power collection and diffusion of oxygen gas.

The electrolyte containing any one of the aforementioned ionic conductors has a high proton conductivity and exerts higher proton conductance than that of the other polymer electrolytes independently of the presence of water. Moreover, the constituent components thereof are insoluble with water, and, in the fuel cell using such an electrolyte, the constituent components of the electrolyte do not dissolve in water produced in the cathode. This allows for providing an electrolyte which is not dissolved by water produced in the cathode of the fuel cell and dramatically extending the life of the fuel cell.

The present invention is described in more detail below by examples and comparative examples but not limited to these examples.

Example 1

(1) Synthesis of diethylmethylammonium trifluoromethanesulfonate

Equimolar amounts of diethylmethylamine and trifluoromethanesulfonic acid were weighed in a glove box under argon atmosphere. The weighed diethylmethylamine and trifluoromethanesulfonic acid were mixed and stirred while being cooled by liquid nitrogen, thus obtaining a target ionic conductor.

(2) Evaluation of Oxygen Reduction Reaction

The cyclic voltammetry measurements were performed using a three-electrode cell with oxygen gas bubbling to the working electrode. The reference electrode, counter electrode, and working electrode were a reversible hydrogen electrode, a platinum wire electrode, and a platinum disk electrode, respectively. The measurements were performed at a measurement temperature of 150° C. and a potential sweep rate of 10 mV/S. The result of the cyclic voltammetry measurements is shown in FIG. 1.

(3) Fuel Cell Power Generation Test

Figure 9:
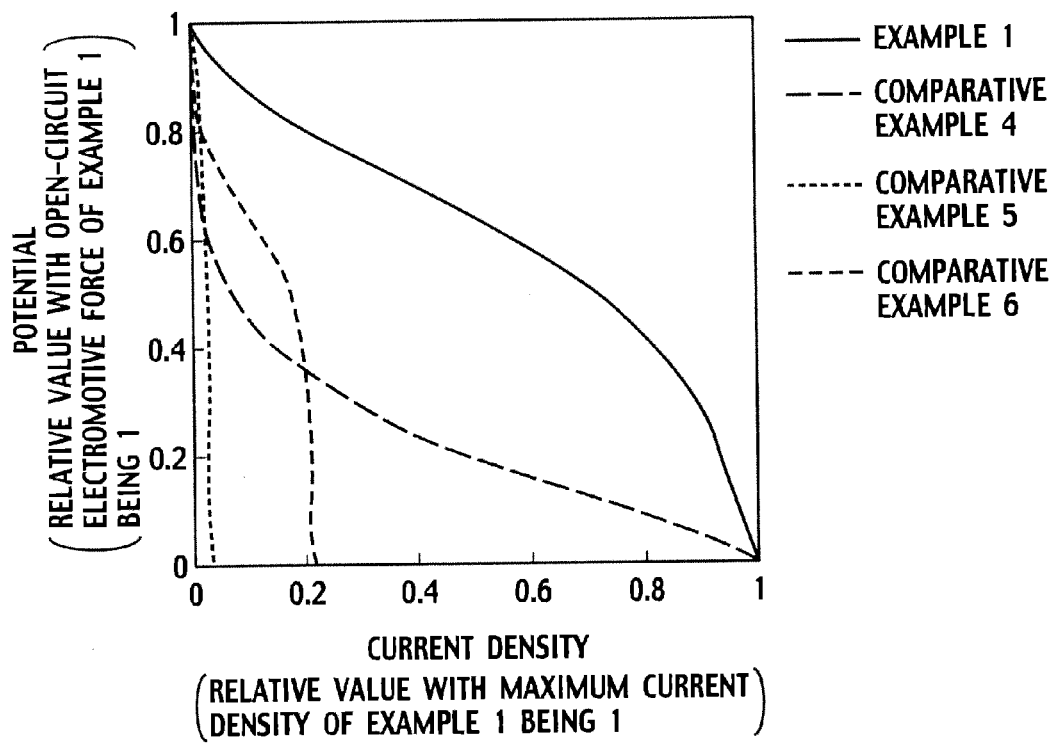
FIG. 9 is a graph showing measurement results of power generation tests of fuel cells of Example 1 and Comparative Examples 4 to 6.

Using a cell similar to the cell used in the evaluation of the oxygen reduction reaction of (2), fuel cell power generation was performed with oxygen bubbling to the working electrode and hydrogen bubbling to the counter electrode. The measurement was performed at a temperature of 150° C. and a potential sweep rate of 10 mV/S. The result of the fuel cell power generation test is shown in FIG. 9.

(4) Measurement of Open-Circuit Electromotive Force

Figure 10:
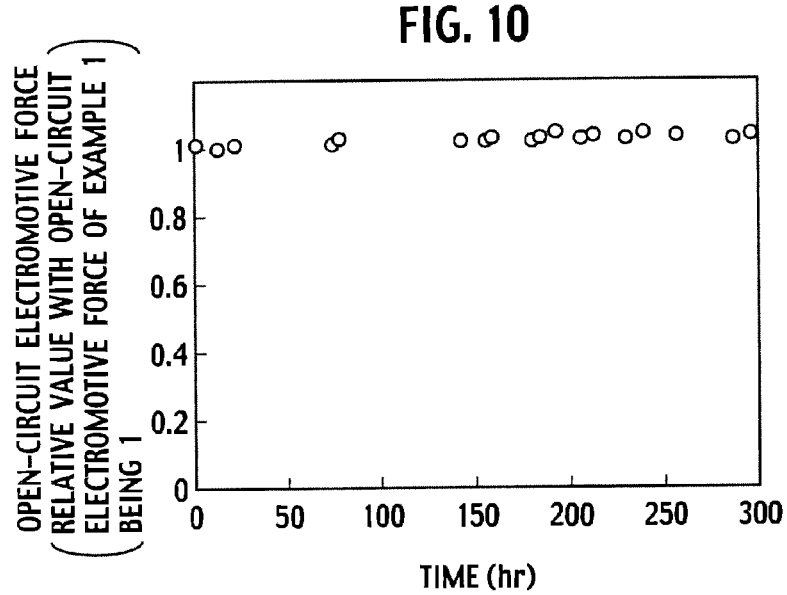
FIG. 10 is a graph showing a measurement result of open-circuit electromotive force of the fuel cell of Example 1.

Using a cell similar to the cell used in the evaluation of the oxygen reduction reaction of (2), open-circuit electromotive force was measured with oxygen bubbling to the working electrode and hydrogen bubbling to the counter electrode. The measurement was performed at 150° C. The measurement result of the open-circuit electromotive force is shown in FIG. 10.

Example 2

(1) Synthesis of ethylpiperidinium trifluoromethanesulfonate

Equimolar amounts of ethylpiperidinium and trifluoromethanesulfonic acid were weighed in a glove box under argon atmosphere. The weighed ethylpiperidinium and trifluoromethanesulfonic acid were mixed and stirred while being cooled by liquid nitrogen, thus obtaining a target ionic conductor.

(2) Evaluation of Oxygen Reduction Reaction

The evaluation of oxygen reduction reaction was performed in the same manner as that of Example 1. The result of the cyclic voltammetry measurements is shown in FIG. 2.

Example 3

(1) Synthesis of dimethylethylammonium trifluoromethanesulfonate

Equimolar amounts of dimethylethylamine and trifluoromethanesulfonic acid were weighed in a glove box under argon atmosphere. The weighed dimethylethylamine and trifluoromethanesulfonic acid were mixed and stirred while being cooled by liquid nitrogen, thus obtaining a target ionic conductor.

(2) Evaluation of Oxygen Reduction Reaction

The evaluation of oxygen reduction reaction was performed in the same manner as that of Example 1. The result of the cyclic voltammetry measurements is shown in FIG. 3.

Example 4

(1) Synthesis of diethylmethylammonium trifluoromethanesulfonate and dimethylethylammonium trifluoromethanesulfonate Syntheses of diethylmethylammonium trifluoromethanesulfonate and dimethylethylammonium trifluoromethanesulfonate were performed in the same manners as those of Examples 1 and 3, respectively.

(2) Evaluation of Oxygen Reduction Reaction

The evaluation of oxygen reduction reaction of each of diethylmethylammonium trifluoromethanesulfonate and dimethylethylammonium trifluoromethanesulfonate was performed in the same manner as that of Example 1. The results of the cyclic voltammetry measurements are shown in FIG. 11.

(3) Evaluation of Hydrogen Oxidation Reaction

For the evaluation of the hydrogen oxidation reaction of each of diethylmethylammonium trifluoromethanesulfonate and dimethylethylammonium trifluoromethanesulfonate, cyclic voltammetry measurements were performed using a three-electrode cell with hydrogen gas bubbling to the working electrode. The reference electrode, counter electrode, and working electrode were a reversible hydrogen electrode, a platinum wire electrode, a platinum disk electrode, respectively. The measurements were performed at a measurement temperature of 150° C. and a potential sweep rate of 10 mV/S. The result of the cyclic voltammetry measurements is shown in FIG. 12.

(4) Preparation of Electrolyte Mixture

Based on the comparison of diethylmethylammonium trifluoromethanesulfonate and dimethylethylammonium trifluoromethanesulfonate in terms of oxygen reduction reaction and hydrogen oxidation reaction (FIGS. 11 and 12), diethylmethylammonium trifluoromethanesulfonate having high activity in the oxygen reduction reaction and dimethylethylammonium trifluoromethanesulfonate having high activity in the hydrogen reduction reaction were allowed to coexist to prepare an electrolyte composed of two types of ionic conductors. Specifically, diethylmethylammonium trifluoromethanesulfonate and dimethylethylammonium trifluoromethanesulfonate were weighed in a molar ratio of 9/1 in a glove box under argon atmosphere, mixed, and then stirred, thus obtaining a target ionic conductor.

(5) Evaluation of Oxygen Reduction Reaction and Hydrogen Oxidation Reaction

The evaluation of oxygen reduction reaction of the ionic conductor which was prepared in (4) and composed of diethylmethylammonium trifluoromethanesulfonate and dimethylethylammonium trifluoromethanesulfonate was performed in the same manner as that of Example 1. The evaluation of hydrogen oxidation reaction thereof was performed in the same manner as that of (3). FIG. 13 shows evaluation results of cell voltage (cell voltage with an IR loss by the ionic conductor eliminated) at a same current density. The cell voltage was calculated from the results of the cyclic voltammetry measurements of the oxidation reduction reaction and hydrogen oxidation reaction of diethylmethylammonium trifluoromethanesulfonate and dimethylethylammonium trifluoromethanesulfonate which were measured in (2) and (3) and the results of the cyclic voltammetry measurements of the oxidation reduction reaction and hydrogen oxidation reaction of the ionic conductor which was prepared in (4) and composed of diethylmethylammonium trifluoromethanesulfonate and dimethylethylammonium trifluoromethanesulfonate.

Comparative Example 1

(1) Synthesis of diethylmethylammonium bis(trifluoromethanesulfonyl)imide

Equimolar amounts of diethylmethylamine and trifluoromethanesulfonylimide were weighed in a glove box under argon atmosphere. The weighed diethylmethylamine and trifluoromethanesulfonylimide were mixed and stirred while being cooled by liquid nitrogen, thus obtaining a target ionic conductor.

(2) Evaluation of Oxygen Reduction Reaction

The evaluation of the oxygen reduction reaction was performed in the same manner as that of Example 1. The result of the cyclic voltammetry measurements is shown in FIG. 4.

Comparative Example 2

(1) Synthesis of diethylmethylammonium hydrogensulfonate

Equimolar amounts of diethylmethylamine and sulfuric acid were weighed in a glove box under argon atmosphere. The weighed diethylmethylamine and sulfuric acid were mixed and stirred while being cooled by liquid nitrogen, thus obtaining a target ionic conductor.

(2) Evaluation of Oxygen Reduction Reaction

The evaluation of the oxygen reduction reaction was performed in the same manner as that of Example 1. The result of the cyclic voltammetry measurements is shown in FIG. 5.

Comparative Example 3

(1) Synthesis of 2-ethylimidazolium trifluoromethanesulfonate 2-ethylimidazole was solved with distilled water, in which an equimolar amount of trifluoromethanesulfonic acid was dropped and stirred while being cooled. The reaction product was predried at 100° C. and then vacuum-dried at 120° C., thus obtaining a target ionic conductor.

(2) Evaluation of Oxygen Reduction Reaction

The evaluation of the oxygen reduction reaction was performed in the same manner as that of Example 1. The result of the cyclic voltammetry measurements is shown in FIG. 6.

Comparative Example 4

(1) Synthesis of butylimidazolium bis(trifluoromethanesulfonyl)imide

Equimolar amounts of butylimidazole and trifluoromethanesulfonylimide were weighed in a glove box under argon atmosphere. The weighed butylimidazole and trifluoromethanesulfonylimide were mixed and stirred while being cooled by liquid nitrogen, thus obtaining a target ionic conductor.

(2) Fuel Cell Power Generation Test

The fuel cell power generation test was performed in the same manner as that of Example 1. The result of the fuel cell power generation test is shown in FIG. 9.

Comparative Example 5

(1) Fuel Cell Power Generation Test

The fuel cell power generation test was performed in the same manner as that of Example 1 except that phosphoric acid anhydride was used as the ionic conductor. The result of the fuel cell power generation test is shown in FIG. 9.

Comparative Example 6

(1) Fuel Cell Power Generation Test

The fuel cell power generation test was performed in the same manner as that of Example 1 except that 1M sulfuric acid was used as the ionic conductor and the measurement temperature was 30° C. The result of the fuel cell power generation test is shown in FIG. 9.

Comparative Example 7

(1) Synthesis of triethylammonium trifluoromethanesulfonate

Equimolar amounts of triethylamine and trifluoromethanesulfonic acid were weighed in a glove box under argon atmosphere. The weighed triethylamine and trifluoromethanesulfonic acid were mixed and stirred while being cooled by liquid nitrogen, thus obtaining a target ionic conductor.

(2) Evaluation of Oxygen Reduction Reaction

The evaluation of the oxygen reduction reaction was performed in the same manner as that of Example 1. The result of the cyclic voltammetry measurements is shown in FIG. 7. The results of the cyclic voltammetry measurements of Example 1 and Comparative Examples 1 and 7 are shown in FIG. 8.

From the evaluation results of the oxygen reduction reaction of Examples 1 and 2 and Comparative Examples 1 to 3, in the electrochemical cells as preferred embodiments of the present invention, reduction currents due to the oxygen reduction reaction were observed at higher potentials (around 1.0 V vs RHE) than those of Comparative Examples 1 to 3. This revealed that the electrochemical cells as preferred embodiments of the present invention had high oxygen reduction reaction activities.

Moreover, from the results of the fuel cell power generation tests of Example 1 and Comparative Examples 4 to 6, the electrochemical cell as preferred embodiment of the present invention had a higher oxygen reduction activity than those of Comparative Examples 4 to 6 and therefore exerted excellent power generation characteristics. Furthermore, phosphoric acid anhydride of the Comparative Example 5 was the ionic conductor used in commercialized phosphoric acid fuel cells, but the electrochemical cell as the preferred embodiment of the present invention exerted power generation characteristics more excellent than those of Comparative Example 5. Accordingly, the electrochemical cell as the preferred embodiment of the present invention was useful as an intended electrochemical cell for a fuel cell which is excellent in fuel cell power generation characteristics under conditions of high temperature and no humidification.

From the measurement result of the open-circuit electromotive force of Example 1, the electrochemical cell as the preferred embodiment of the present invention had no reduction in open-circuit electromotive force observed during the measurement time and therefore had high chemical durability.

Furthermore, from Example 4, by adding the ionic conductor having high oxygen reduction activity with the ionic conductor having higher hydrogen oxidation activity than that of the above ionic conductor having high oxygen reduction activity, the electrochemical cell were highly active both in the oxygen reduction and hydrogen oxidation and increased in cell voltage. Accordingly, such an electrochemical cell as the preferred embodiment of the present invention is useful as an intended electrochemical cell for a fuel cell which is excellent in fuel cell power generation characteristics under conditions of high temperature and no humidification.

Figure 16:
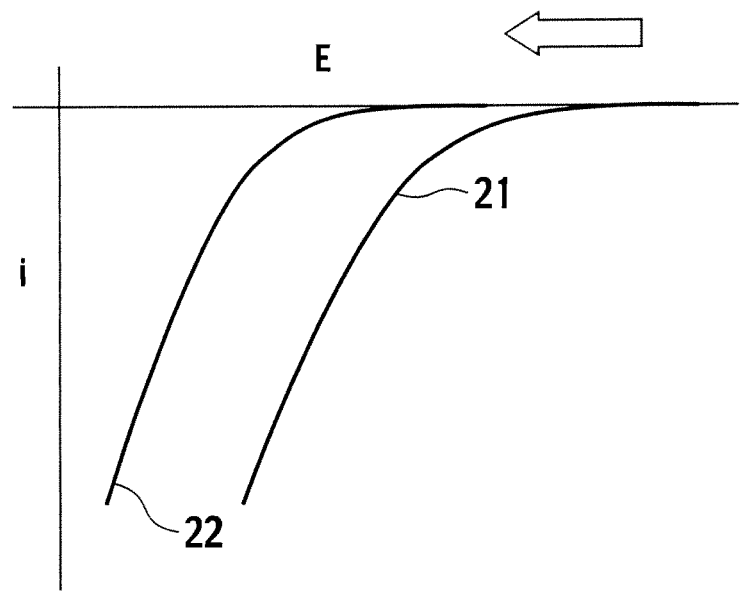
FIG. 16 is a view for explaining a relation between the cyclic voltammetry and oxygen reduction reactivity.

Herein, using FIG. 16, a description is given of a reason why the oxygen reduction reactivity is evaluated by cyclic voltammetry measurements.

In a fuel cell, the hydrogen oxidation reaction (1) occurs in the anode, and the oxygen reduction reaction (2) occurs in the cathode.

$$H_2 \rightarrow 2H^+ + 2e^- \quad (1)$$

$$O_2 + 4H^+ + 4e^- \rightarrow 2H_2O \quad (2)$$

By cyclic voltammetry measurements, results of individually evaluating the aforementioned reactions (1) and (2) can be obtained.

The potential on an electrode indicates a measure of ease of reaction in the surface of the electrode, and the current flowing through the electrode indicates reaction rate in the surface of the electrode.

As for the oxygen reduction reaction of Equation (2), in order to cause the reaction to proceed from the left to the right in Equation (2) (to reduce oxygen), it is necessary to supply electrons. To supply electrons, a negative potential is applied. The applied potential is varied in such a manner that the absolute value thereof increases (in the direction of an arrow of FIG. 16), and a potential at which the reaction to the right starts to occur is over-voltage of oxygen reduction. The reaction proceeding to the right with a low potential being applied means that the oxygen reduction reaction easily occurs. Specifically, as shown in FIG. 16, in the case of an ionic conductor with high oxygen reduction reactivity, the oxygen reduction reaction proceeds at a low potential as shown by a curve 21. However, in the case of an ionic conductor with low oxygen reduction reactivity, as shown by a curve 22, the oxygen reduction reaction does not proceed without a high potential being applied.

Considering the hydrogen oxidation reaction of the above Formula (1) in a similar manner, an electrolyte in which both reactions of oxygen reduction and hydrogen oxidation proceed at a low potential (over-voltage) is excellent as an electrolyte for a fuel cell.

Although the invention has been described above by reference to certain embodiments of the invention, the invention is not limited to the embodiments described above and modifications may become apparent to these skilled in the art, in light of the teachings herein. The scope of the invention is defined with reference to the following claims.

What is claimed is:

1. An electrochemical cell comprising:
   an anode;
   a cathode; and
   an electrolyte membrane having one side bonded to the anode and the other side bonded to the cathode and containing at least two types of ionic conductors different from each other,
   wherein each of the ionic conductors comprises:
   (a) any one of:
   (i) a cation expressed by any one of Formulae (1) and (2):

$$R_1R_2R_3HN^+ \quad (1)$$

where, in Formula (1), $R_1$, $R_2$ and $R_3$ each indicate any one of alkyl groups C1 to C18 except a structure in which $R_1=R_2=R_3$, $$R_1R_2HS^+ \quad (2)$$

where, in Formula (2), $R_1$ and $R_2$ each indicate any one of alkyl groups C1 to C18 except a structure in which $R_1=R_2$;

(ii) a cation expressed by any one of Formulae (4) and (5):

$$R_5R_6H_2N^+ \quad (4)$$

where, in Formula (4), $R_5$ and $R_6$ each indicate any one of alkyl groups C1 to C18 except a structure in which $R_5=R_6$, $$R_5H_2S^+ \quad (5)$$

where, in Formula (5), $R_5$ indicates any one of alkyl groups C1 to C18;

(iii) a cation expressed by Formula (7):

$$R_8H_3N^+ \quad (7)$$

where, in Formula (7), $R_8$ indicates any one of alkyl groups C1 to C18; and (iv) a cation expressed by Formula (9):

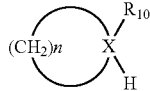
   (9)

where, Formula (9) indicates an aliphatic heterocyclic compound containing X in which X indicates N, $R_{10}$ indicates any one of alkyl groups C1 to C18, and n indicates any one of 3 to 18; and (b) an anion expressed by Formula (3):

$$R_4SO_3^- \quad (3)$$

where, in Formula (3), $R_4$ indicates any one of an alkyl group and a fluoroalkyl group, and wherein one of the at least two types of ionic conductors has the highest oxygen reduction activity among the at least two types of ionic conductors and the other type of ionic conductor has a higher hydrogen oxidation activity than the ionic conductor having the highest oxygen reduction activity.

2. The electrochemical cell according to claim 1,
   wherein the electrolyte membrane contains two types of ionic conductors different from each other, and
   one of the two types of ionic conductors has a relatively high oxygen reduction activity and the other type of ionic conductor has a relatively higher hydrogen oxidation activity than that of the ionic conductor having a relatively high oxygen reduction activity.

3. The electrochemical cell according to claim 2,
   wherein the content of the ionic conductor having the relatively high oxygen reduction activity is not less than 50 mol %.

4. A fuel cell, comprising:
   an electrochemical cell according to claim 1.

* * * * *